United States Patent [19]
Janson et al.

[11] 3,974,709
[45] Aug. 17, 1976

[54] SCREW AND FOLLOWER POSITIONING DEVICE

[75] Inventors: Norma M. Janson, Hopewell Junction; Carl Yakubowski, Hyde Park, both of N.Y.

[73] Assignee: International Business Machines Corporation, Armonk, N.Y.

[22] Filed: Nov. 15, 1974

[21] Appl. No.: 524,105

[52] U.S. Cl. .......................... 74/424.8 A; 74/89.15; 82/27
[51] Int. Cl.² .................. F16H 27/02; F16H 25/22
[58] Field of Search ............ 82/23, 27; 74/424.8 A, 74/424.8 NA, 89.15, 25, 424.8 R

[56] References Cited
UNITED STATES PATENTS

| | | | |
|---|---|---|---|
| 1,918,587 | 7/1933 | Bryant | 74/424.8 A |
| 2,365,654 | 12/1944 | White | 74/424.8 A |
| 2,756,606 | 7/1956 | Staples | 82/23 X |
| 2,969,689 | 1/1961 | Martens | 74/424.8 NA |
| 3,169,407 | 2/1965 | Newell | 74/424.8 R |
| 3,289,061 | 11/1966 | Stratman | 82/27 X |
| 3,398,599 | 8/1968 | Hill | 74/424.8 R |
| 3,533,298 | 10/1970 | Gerber | 74/89.15 |
| 3,745,840 | 7/1973 | Guralnick | 74/89.15 |

*Primary Examiner*—Leonidas Vlachos
*Attorney, Agent, or Firm*—Sughrue, Rothwell, Mion, Zinn & Macpeak

[57] ABSTRACT

A high speed positioning device having a lead screw, a slidable frame and a screw engaging roller assembly supported by the frame for axial movement along the screw. The screw engaging roller assembly includes a pair of opposed rollers supported by a pair of pivoted, spring biased roller carriers which urge the rollers into meshing engagement with the lead screw to move the assembly and consequently the frame relative to the screw as the screw is rotated relative to the frame. Each roller has two degrees of rotational freedom with respect to its associated roller carrier to follow the helical threads of the lead screw. This arrangement provides an anti-backlash coupling between the lead screw and the screw roller assembly, thereby permitting accurate high speed positioning of parts, probes, machine tools and the like.

3 Claims, 5 Drawing Figures

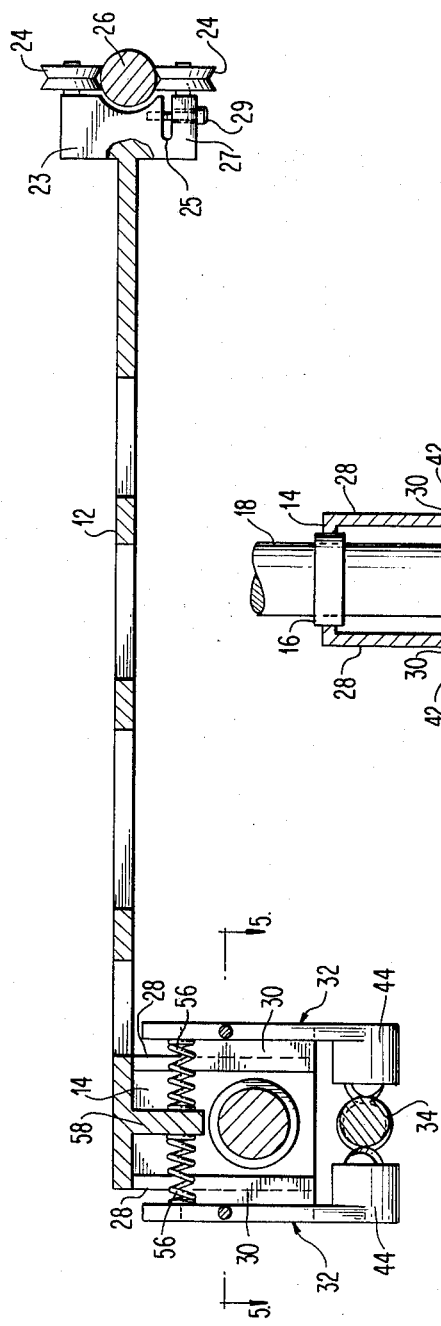

SCREW AND FOLLOWER POSITIONING DEVICE

BACKGROUND OF THE INVENTION

This invention relates to a positioning device which permits accurate high speed positioning of parts, probes, machine tools and the like and more specifically to a lead screw and follower drive arrangement which has reduced inertial load and component friction as well as increased component stiffness.

In positioning devices of the screw and follower drive type, it is necessary for accurate high speed positioning that the inertial load and component friction are minimum while the component stiffness is maximum. Many prior art lead screw and nut device utilize circulating ball bearings between the nut and screw which reduce component friction to a minimum. However, such arrangements are notoriously expensive and still suffer from the backlash problem.

Other prior art lead screw and nut devices have utilized a pair of axially spaced apart nut followers which may be rotatively adjusted relative to each other and the lead screw to eliminate backlash. However, such mechanisms have extremely high component friction and to utilize circulating ball bearings in each nut should be prohibitively expensive.

SUMMARY OF THE INVENTION

The present invention provides an improved positioning device of the lead screw and nut type wherein inertial load and component friction are minimum and component stiffness is maximum.

The present invention provides an improved positioning device of the lead screw and nut type having minimum backlash to enable a high degree of positional accuracy to be achieved.

The present invention provides an improved positioning device which comprises a helically threaded lead screw, a screw engaging roller assembly and a slidable frame for supporting the screw engaging roller assembly for axial movement along the lead screw. The screw engaging roller assembly includes a pair of opposed rollers supported by a pair of pivoted, spring biased roller carriers which urge the rollers into meshing engagement with the lead screw on both sides thereof. Each roller has two degrees of rotational freedom with respect to its associated roller carrier to follow the helical threads of the lead screw. Rotation of the lead screw about its longitudinal axis causes axial movement of the screw engaging roller assembly and consequently the slidable frame. Because of reduced inertial load and component friction as well as increased component stiffness, this arrangement permits accurate high speed positioning of parts, probes, machine tools and the like.

The foregoing and other objects, features and advantages of the invention will be apparent from the following more detailed description of a preferred embodiment of the invention as illustrated in the accompanying drawings.

BRIEF DESCRIPTION OF THE DRAWING

FIG. 4 is a longitudinal sectional view of the positioning device as taken along the line 4—4 of FIG. 1; and FIG. 5 is a horizontal sectional view as taken along the line 5—5 of FIG. 4.

DETAILED DESCRIPTION OF THE INVENTION

Figure 1:
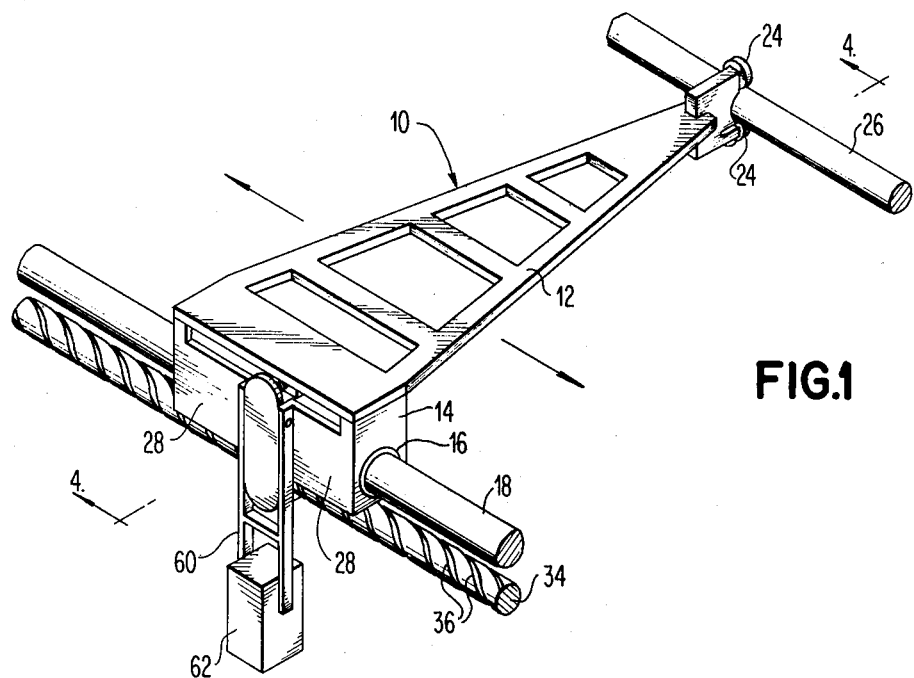
FIG. 1 is a perspective view of a positioning device embodying the invention.

Referring now to FIG. 1, the positioning device 10 includes a slidable frame 12 having a pair of depending flanges 14 apertured at their lower ends and provided with suitable bearings 16 for slidably receiving a first stabilizing rod 18. The slidable frame 12 further includes a pair of vertically opposed rollers 24 at the opposite end thereof which are kept in rolling engagement with a second stabilizing rod 26 extending parallel to the first stabilizing rod 18. The function of the second stabilizing rod 26 is to prevent rotation of the slidable frame 12 about the axis of the first stabilizing rod 18 as the slidable frame is moved therealong. As best seen in FIG. 4 the support 23 for the rollers 24 is provided with a notch 25 which defines a support arm 27 for one of the rollers. For complete system stiffness, the opposed rollers 24 are preloaded against opposite sides of the rod 26 by adjusting screw 29 which extends through arm 27 into thread engagement with support 23.

The slidable frame 12 further includes two pairs of support arms 28 which extend horizontally from the depending flanges 14, as is best shown in FIGS. 4 and 5. Each pair of support arms 28 are fixed to or formed integrally with a depending flange 14 and extend therefrom parallel to each other in a direction toward the other pair. Each support arm 28 is provided at its end with an outwardly extending projection 30. Each pair of projections 30 provides a support for a screw roller assembly 32.

A lead screw 34 extends horizontally parallel to and beneath the first stabilizing rod 18 and is drivingly engaged by each screw roller assembly 32. The lead screw 34 is provided with helical grooves 36. The lead screw may be solid or formed of tubular steel. Although not shown, provision is made for supporting the lead screw 34 for rotation about its longitudinal axis. A suitable drive means is also provided for rotating the lead screw about its longitudinal axis in a conventional manner.

Figure 2:
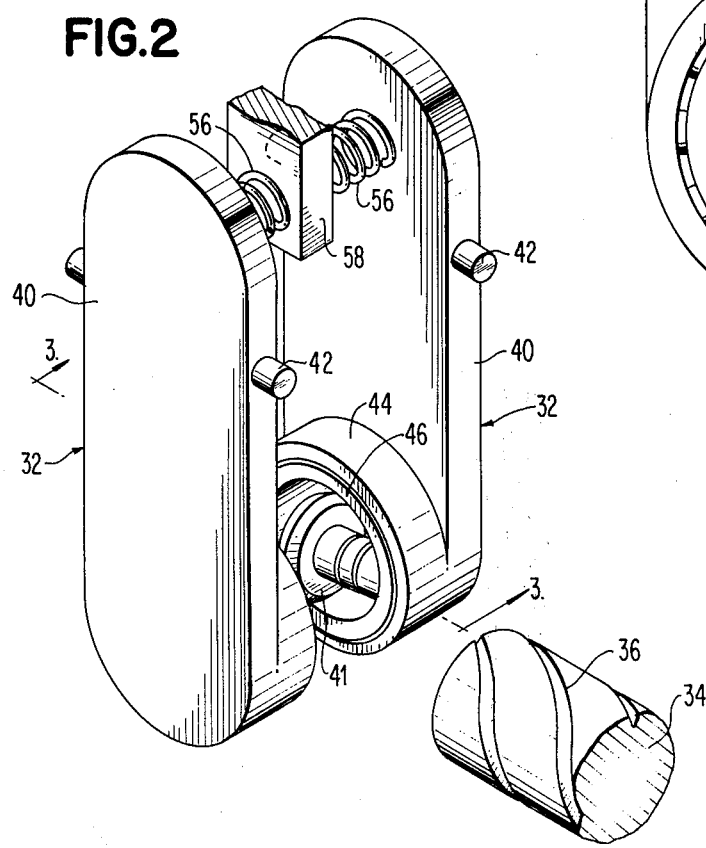
FIG. 2 is an enlarged perspective view showing the screw engaging roller assembly and the lead screw out of engagement for the sake of illustration.

Turning now to FIG. 2, each screw roller assembly 32 is comprised of a generally L-shaped roller carrier which rotatably supports a roller 41 for meshing engagement with a helical groove 36 on the lead screw 34. Each roller carrier is comprised of a plate portion 40 having an aperture therein through which a pivot pin 42 extends. As is best shown in FIG. 5, each pivot pin 42 also extends through a pair of apertures 43 in the projections 30 for pivotally supporting each roller carrier assembly 32.

Figure 3:
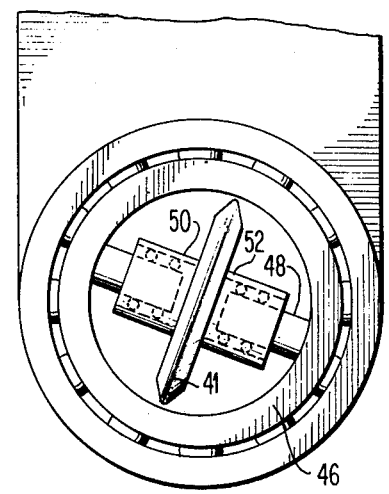
FIG. 3 is a view of one roller as seen from the line 3—3 of FIG. 2.

The foot portion of each roller carrier assembly 32 is comprised of a hollow cylindrical projection 44 having a rotatable cylindrical bearing race 46 journaled therein. Each roller 41 has two degrees of rotational freedom with respect to the roller projection 44. More particularly, the roller 41 is free to rotate about the axis of a pin 48 which is fixed to the race 46 in the cylindrical projection 44, as is best shown in FIG. 3. The roller 41 is disposed between two duplex pairs of preloaded ball bearings 50 and 52 and is fixed to the outer races of the ball bearings while the inner races are fixed to the pin 46.

The engagement between the rollers 41 and the lead screw 34 is accomplished by pivoting the roller carrier assemblies 32 about the pivot pins 42. A matched pair of compression springs 56 are provided for urging the upper plate portions 40 of the roller carrier assemblies 32 away from each other so that the rollers 41 move into meshing engagement with the grooves on the lead screw 34. As is shown in FIGS. 2 and 4, a boss 58 depends from the frame 12, providing a support on which the compression springs 56 are mounted. Since, as described above, the rollers 41 have two degrees of rotational freedom with respect to their associated roller carrier assemblies 32, the rollers can automatically adjust themselves to any helix angle of the grooves 36 in lead screw 34.

The forces applied to the lead screw by the compression springs through roller carrier assemblies are equal and opposite in magnitude and on the same line of action. Therefore, the resultant of the forces which might cause deflection of the lead screw 34 is zero.

Reverting to FIG. 1, the slidable frame 12 further includes a depending support member 60 on which a probe assembly 62 or any other apparatus, to be positioned selectively along the lead screw 34, is mounted. This assembly or apparatus is merely representative of any object which can be indexed along the guide rods and forms no part of the present invention.

Thus, by engaging the helical grooves in the lead screw by a pair of opposed rollers all extraneous forces on the screw are eliminated and the friction between the screw and follower assembly is minimized. Furthermore, since the rollers can freely adjust to the helix all backlash will be substantially eliminated.

While the invention has been particularly shown and described with reference to a preferred embodiment thereof, it will be understood by those in the art that various changes in form and details may be made therein without departing from the spirit and scope of the invention.

What is claimed is:

1. A positioning device comprising:
   a rotatable lead screw having helical threads;
   a pair of opposed rollers disposed in meshing engagement simultaneously with the helical threads of said screw; and
   roller carrier means for rotatably supporting said rollers so that each roller has two degrees of rotational freedom relative to said carrier means and for holding said rollers in meshing engagement with said lead screw, said roller carrier means being movable along said lead screw in either direction in response to the rotation of said lead screw.

2. A positioning device comprising:
   a rotatable lead screw having helical threads;
   a pair of opposed rollers simultaneously engaged with the helical threads of said lead screw;
   a pair of pivoted roller carriers for rotatably supporting said opposed rollers so that each roller has two degrees of rotational freedom with respect to its associated roller carrier to follow the helical threads of said lead screw;
   spring means for biasing said pivoted roller carriers in directions to urge said opposed rollers into simultaneous meshing engagement with said lead screw; and
   a slidable frame for supporting said pivoted roller carriers for axial movement along said lead screw.

3. The device of claim 2 further comprising a stabilizing rod disposed parallel to said lead screw and supporting said slidable frame and means for preventing rotation of said slidable frame about the axis of said rod.

* * * * *